125,600

UNITED STATES PATENT OFFICE.

THOMAS J. MAYALL, OF BOSTON, MASSACHUSETTS.

IMPROVEMENT IN PREPARING EMERY-VULCANITE, OR HARD-RUBBER COMPOUNDS.

Specification forming part of Letters Patent No. 125,600, dated April 9, 1872.

*To whom it may concern:*

Be it known that I, THOMAS J. MAYALL, of Boston, Suffolk county, Massachusetts, have invented certain new and useful Improvements in the Mode of Preparing Emery-Vulcanite, or Hard-Rubber Compound, for use in the manufacture of wheels and other articles, of which the following is a specification:

My invention relates to the manufacture of articles of emery-vulcanite—a composition consisting, in the main, of a hard-rubber compound mixed with emery.

According to the method heretofore in use, it has been customary to grind together the rubber and sulphur, and to mix with them, during this process, the emery, which is fed in between the grinding-rolls along with the sulphur and rubber, the three substances being mixed or kneaded together in a plastic condition. This process is open to the objection that the mixture is not always homogeneous throughout, and that there may be in one part of the compound an excess of emery over the rubber and sulphur, and in another part too little emery; or, in other words, there is not at all times that thorough and intimate intermixture of these substances which is necessary in order to produce from it wheels and other articles of uniform quality throughout.

It is the object of my present invention to remedy this difficulty; and to this end my invention consists in first making a solution of the rubber and sulphur, by dissolving them in naphtha, camphene, or other solvent, and then mixing with this solution the emery, which is stirred into it, so that each grain of the emery may be coated with the liquid, whereby a vulcanizable emery-vulcanite, or hard-rubber compound is obtained, perfectly homogeneous and adapted to produce better results than practicable heretofore. The compound, after being formed, and when it reaches a slightly-tacky condition, is molded and pressed into the shape required for the finished article, and is then put into the heater and vulcanized in in the usual way.

To enable those skilled in the art to understand and use my invention, I shall proceed to describe more particularly the manner in which the same is or may be carried into effect.

I take the native rubber and sulphur in the requisite proportions—say five ounces sulphur to one pound rubber—and grind them together. I then, for the purpose of facilitating the action of the naphtha or other solvent upon the compound, roll out the same into a thin sheet, and place it in a pan containing sufficient naphtha or other solvent to cover it, and let it remain there, say, about an hour, to allow the naphtha to cut and be taken up by the rubber. I then take the mass and put it in a covered tank, usually termed a "devil," containing naphtha and provided with stirring-arms or blades, in which it is worked and beaten by the arms until it is thoroughly and completely dissolved in the naphtha. The quantity of naphtha employed varies in accordance with the consistency required for the solution. I use from two quarts to one gallon of naphtha to one pound of the compound. When the solution is too thick more naphtha can be poured in. After the solution is brought to the required condition—and it should be so thin as not to interfere with the ready intermixture of the emery with it—it is drawn off into another pan or tank, where the emery is poured into and mixed with it. No more emery is put in than can take up the solution, the object being to saturate the emery or to moisten and coat every grain of it with the liquid. When the compound has been brought to this condition by thorough stirring and intermixture the naphtha is allowed to evaporate until the desired consistency is attained, when it is ready to be formed into wheels or other articles. For this purpose it is molded under pressure in an hydraulic press, or by other suitable means; and after being thus molded and pressed is taken out from the mold and vulcanized in a heater in the usual way, being either put in a mold, or covered with emery-sand, or otherwise held in shape during the vulcanizing process.

By this means wheels and other articles of emery-vulcanite are produced of uniform quality and homogeneous throughout, the difficulty above mentioned as attending the present manufacture of emery-vulcanite articles being entirely obviated and remedied.

Having described my invention, and the manner in which the same is or may be carried into effect, what I claim, and desire to secure by Letters Patent, is—

The mode herein described of preparing emery-vulcanite, or hard-rubber compound, to be used in the manufacture of wheels and other articles, by first dissolving the sulphur and rubber, and then mixing with said solution the emery, substantially as and for the purposes set forth.

In testimony whereof I have signed my name to this specification before two subscribing witnesses.

THOS. J. MAYALL.

Witnesses:
EDM. F. BROWN,
M. BAILEY.